United States Patent [19]

Kamiguchi et al.

[11] Patent Number: 5,309,369
[45] Date of Patent: May 3, 1994

[54] OPERATING STATE MONITORING METHOD FOR INJECTION MOLDING MACHINES

[75] Inventors: Masao Kamiguchi; Noriaki Neko; Osamu Saito, all of Oshino, Japan

[73] Assignee: Fanuc, Ltd., Yamanashi, Japan

[21] Appl. No.: 829,049

[22] PCT Filed: Jun. 5, 1991

[86] PCT No.: PCT/JP91/00761

§ 371 Date: Feb. 10, 1992

§ 102(e) Date: Feb. 10, 1992

[87] PCT Pub. No.: WO91/19601

PCT Pub. Date: Dec. 26, 1991

[30] Foreign Application Priority Data

Jun. 18, 1990 [JP] Japan .................. 2-157744

[51] Int. Cl.⁵ .......................................... G06F 15/46
[52] U.S. Cl. .......................... 364/476; 264/40.7; 364/188; 425/170
[58] Field of Search ............... 364/476, 473, 188, 189, 364/191–193, 550, 551.01; 264/40.1–40.7; 425/135, 149, 163, 169, 170, 171, 173

[56] References Cited

U.S. PATENT DOCUMENTS

| | | | |
|---|---|---|---|
| 3,760,251 | 9/1973 | Posl et al. | 364/138 X |
| 4,674,053 | 6/1987 | Bannai et al. | 364/188 X |
| 4,823,274 | 4/1989 | Kiya et al. | 364/188 X |
| 4,899,288 | 2/1990 | Tsutsumi | 364/476 |
| 5,005,116 | 4/1991 | Fujita et al. | 364/476 X |
| 5,062,052 | 10/1991 | Sparer et al. | 364/476 X |

Primary Examiner—Joseph Ruggiero
Attorney, Agent, or Firm—Staas & Halsey

[57] ABSTRACT

A monitoring method capable of properly collectively managing the operating states and operation records of a group of injection molding machines. Monitor data sets delivered from the individual injection molding machines are cyclically detected by means of a processor of a monitor unit, and a plurality of sets of up-to-date monitor data for the individual injection molding machines are renewably loaded into a plurality of data tables. When the preset time of a timer associated with any one of the injection molding machines is up, or when the current injection frequency reaches a predetermined frequency, it is concluded that the monitor data output timing is reached, and whether the monitor data should be printed or displayed on a screen is further determined. In a print process or display process, the oldest data group, which includes the oldest monitor data set and the next oldest monitor data set or a combination of two these data sets and calculated monitor data variations associated therewith, is first printed or displayed, and similar data groups are successively printed or displayed by priority of oldness. When the print or display of the up-to-date data group, including the up-to-date monitor data set, is finished, a monitor data reload process is executed in order to update a plurality of monitor data sets to prepare for the next monitor data delivery.

11 Claims, 8 Drawing Sheets

FIG.2

| | FIRST DATA TABLE R1 | | | | |
|---|---|---|---|---|---|
| $R_{11}$ | $R_{111}$ (INJECT. FREQUENCY) | $R_{112}$ (CUSHION DEPTH) | $R_{113}$ (INJECT. TIME) | | $R_{11M}$ |
| $R_{21}$ | $R_{211}$ | $R_{212}$ | $R_{213}$ | | $R_{21M}$ |
| $R_{31}$ | $R_{311}$ | $R_{312}$ | $R_{313}$ | | $R_{31M}$ |
| ⋮ | ⋮ | ⋮ | ⋮ | ⋮ | ⋮ |
| $R_{i1}$ | $R_{i11}$ | $R_{i12}$ | $R_{i13}$ | | $R_{i1M}$ |
| ⋮ | ⋮ | ⋮ | ⋮ | ⋮ | ⋮ |
| $R_{N1}$ | $R_{N11}$ | $R_{N12}$ | $R_{N13}$ | | $R_{N1M}$ |

FIG.3

| | SECOND DATA TABLE R2 | | | | |
|---|---|---|---|---|---|
| $R_{12}$ | $R_{121}$ (INJECT. FREQUENCY) | $R_{122}$ (CUSHION DEPTH) | $R_{123}$ (INJECT. TIME) | | $R_{12M}$ |
| $R_{22}$ | $R_{221}$ | $R_{222}$ | $R_{223}$ | | $R_{22M}$ |
| $R_{32}$ | $R_{321}$ | $R_{322}$ | $R_{323}$ | | $R_{32M}$ |
| ⋮ | ⋮ | ⋮ | ⋮ | ⋮ | ⋮ |
| $R_{i2}$ | $R_{i21}$ | $R_{i22}$ | $R_{i23}$ | | $R_{i2M}$ |
| ⋮ | ⋮ | ⋮ | ⋮ | ⋮ | ⋮ |
| $R_{N2}$ | $R_{N21}$ | $R_{N22}$ | $R_{N23}$ | | $R_{N2M}$ |

FIG.4

| | K'TH DATA TABLE RK | | | | |
|---|---|---|---|---|---|
| $R_{1K}$ | $R_{1K1}$ (INJECT. FREQUENCY) | $R_{1K2}$ (CUSHION DEPTH) | $R_{1K3}$ (INJECT. TIME) | | $R_{1KM}$ |
| $R_{2K}$ | $R_{2K1}$ | $R_{2K2}$ | $R_{2K3}$ | | $R_{2KM}$ |
| $R_{3K}$ | $R_{3K1}$ | $R_{3K2}$ | $R_{3K3}$ | | $R_{3KM}$ |
| ⋮ | ≈ | ≈ | ≈ | ≈ | ≈ |
| $R_{iK}$ | $R_{iK1}$ | $R_{iK2}$ | $R_{iK3}$ | | $R_{iKM}$ |
| ⋮ | ≈ | ≈ | ≈ | | ≈ |
| $R_{NK}$ | $R_{NK1}$ | $R_{NK2}$ | $R_{NK3}$ | | $R_{NKM}$ |

OPERATING STATE MONITORING METHOD FOR INJECTION MOLDING MACHINES

BACKGROUND OF THE INVENTION

1. Field of the Invention

The present invention relates to a monitoring method for properly collectively managing the operating states and operation records of a group of injection molding machines.

2. Description of the Related Art

It is known that the conformity of products can be determined by visually comparing product samples, extracted from a group of products obtained by repeating molding cycles, with conforming article samples. However, the determination of the conformity of the products by the sampling inspection is troublesome. Conventionally, therefore, molding process data (cushioning depth, injection time, etc.), detected in injection molding machines during the execution of the molding cycles and related to the conformity of the products, are cyclically printed or displayed on a screen under the control of a monitor unit, whereby they are offered as monitor data for an operator's monitoring (determination of product conformity) of the operating states of the injection molding machines.

In collectively managing a group of injection molding machines by using one monitor unit, monitor data for the individual injection molding machines are printed or displayed in rotation as detected by means of the monitor unit. The operator discriminates the conformity of an up-to-date molding cycle by determining whether or not up-to-date printed or displayed data are within a range for admission. In order to grasp the operation records of each injection molding machine, moreover, the operator picks out only those monitor data which are associated with the injection molding machine concerned, among other printed or displayed data, and checks the transition of the monitor data.

Although the conformity of the up-to-date molding cycle can be determined without a hitch by referring to the up-to-date monitor data, it is difficult to grasp the operation records of each injection molding machine. Thus, according to the conventional method described above, the monitor data for the group of injection molding machines are printed or displayed in rotation as detected, so that monitor data for another injection molding machine exist among the monitor data associated with the molding cycles successively executed by means of each injection molding machine. It is difficult, therefore, to pick out only the associated data among a lot of printed or displayed data. If the monitor data are delivered from each of those injection molding machines whose cycle times for each molding cycle are different with every predetermined molding cycle frequency, in particular, the delivery time intervals for the molding process data from the individual injection molding machines are different. Accordingly, the print intervals or display intervals for the monitor data for the individual injection molding machines are different from one another, so that it is more difficult to pick out the associated data. In displaying the monitor data on the screen, moreover, old monitor data are scrolled up, or new monitor data are overwritten on the old monitor data. It is impossible, therefore, to display sufficient monitor data for the management of the operation records of a large number of injection molding machines.

SUMMARY OF THE INVENTION

The object of the present invention is to provide a monitoring method capable of properly collectively managing the operating states and operation records of a group of injection molding machines.

In order to achieve the above object, a monitoring method according to the present invention comprises a process for periodically detecting a set of monitor data indicative of various operating states of a group of injection molding machines, a process for visually outputting the detected monitor data; and a process for storing at least a set of past detected monitor data for the individual injection molding machines, the monitor data outputting process including simultaneously outputting a set of up-to-date monitor data and at least a set of past monitor data for the injection molding machines associated therewith.

Preferably, a mode in which at least a set of monitor data variations are calculated on the basis of the set of up-to-date monitor data and at least a set of past monitor data corresponding thereto, and the monitor data variations, along with the up-to-date and past monitor data sets, are visually outputted, or a mode in which the monitor data variations are neither calculated nor outputted is independently selected for each injection molding machine. Further, a mode in which the monitor data/monitor data variations are outputted at predetermined time intervals or a mode in which the monitor data/monitor data variations are outputted with every predetermined molding cycle frequency is independently selected for each injection molding machine. The predetermined time intervals and the predetermined molding cycle frequency are independently set for each injection molding machine. A mode in which the monitor data/monitor data variations are printed, a mode in which the monitor data/monitor data variations are displayed on a screen, or a mode in which the monitor data/monitor data variations are printed and displayed on the screen is independently selected for each injection molding machine.

According to the monitoring method of the present invention, as described above, the up-to-date and past monitor data for each injection molding machine among a group of injection molding machines are simultaneously visually outputted, so that an operator can precisely grasp the operating states and operation records of the individual injection molding machines, and properly determine the conformity of products manufactured by means of the individual injection molding machines.

Preferably, the monitor data variations are outputted together with the up-to-date and past monitor data, so that the operation records of the injection molding machines can be grasped easily and precisely. Further, the mode in which the monitor data/variations are outputted at the predetermined time intervals fit for each injection molding machine or the mode in which the monitor data/variations are outputted with every predetermined molding cycle frequency is independently selected for each injection molding machine, and also, the mode in which the monitor data/variations are printed, the mode in which the monitor data/variations are displayed on the screen, or the mode in which the monitor data/variations are printed and displayed on the screen is independently selected for each injection molding machine. Accordingly, the monitor data/variations associated with each injection molding machine can be outputted in a manner fit for the type of the molding cycle of each injection molding machine, and the operating states and operation records of the individual injection molding machines can be properly grasped.

BRIEF DESCRIPTION OF THE DRAWINGS

FIG. 2 is a diagram showing a first data table provided in a memory of a monitor unit of FIG. 1 and used to store an up-to-date monitor data set for the individual injection molding machines;

FIG. 3 is a diagram showing a second data table used to store a past monitor data set;

FIG. 4 is a diagram showing a K'th data table used to store a past monitor data set;

DESCRIPTION OF THE PREFERRED EMBODIMENTS

Figure 1:
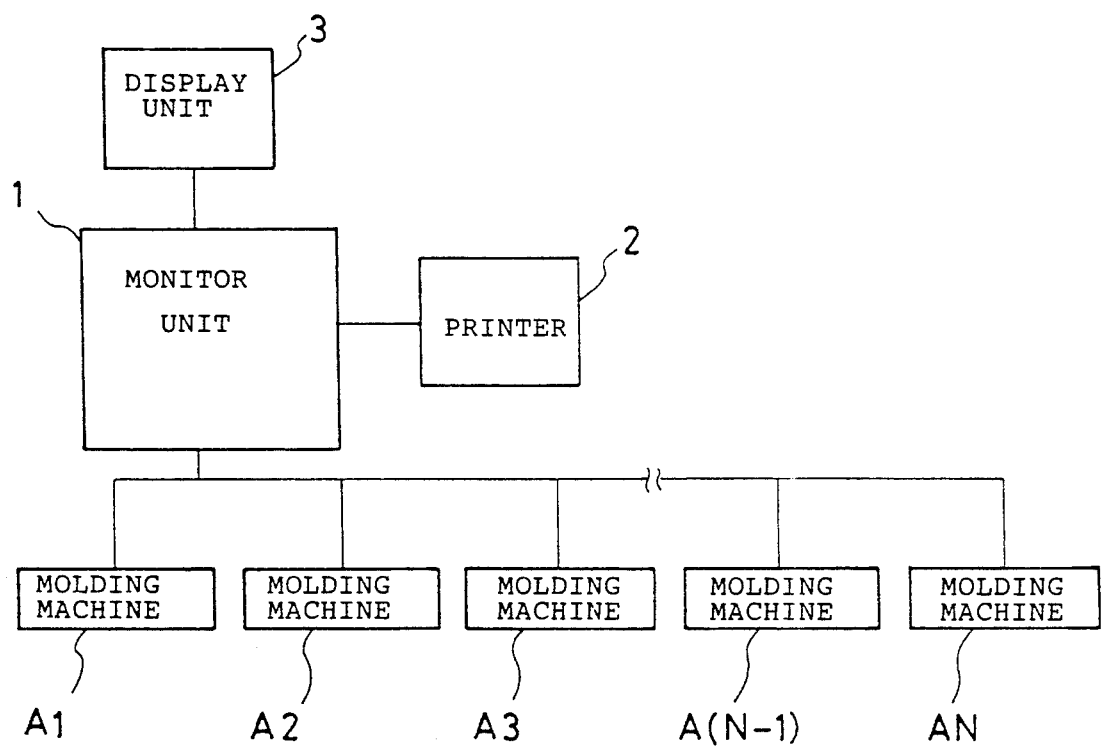
FIG. 1 is a diagram showing a management system for carrying out a monitoring method according to one embodiment of the present invention, along with a group of injection molding machines.

Referring now to FIG. 1, a management system for carrying out a monitoring method according to one embodiment of the present invention will be described.

The management system comprises a monitor unit 1 for collectively managing first to N'th injection molding machines Ai (i=1, 2, ..., N), a printer 2, and a display unit 3. The monitor unit 1 includes a processor, a memory, an input/output circuit, and a keyboard (none of which are shown). The injection molding machines A1 to AN manufacture products of the same or different types by repeating molding cycles under the control of a computer numerical control device (not shown). Each of these molding machines detects and stores the injection frequency, which is indicative of the molding cycle execution frequency, and at the same time, detects a set of molding process data (cushioning depth, injection time, metering time, metering end position, peak value of injection pressure, screw position for switching from injection speed control to injection pressure control, etc.) for each of the repeatedly executed molding cycles, and stores the set of molding process data for the up-to-date molding cycle.

The monitor unit 1 cyclically detects a set of monitor data indicative of the operating state of each injection molding machine Ai by cyclically fetching the injection frequency and the set of molding process data detected and stored by each molding machine, and successively visually outputs the detected up-to-date monitor data set along with at least a set (e.g., (K− 1) number of sets) of past monitor data. Thus, K number of sets of up-to-date monitor data for each injection molding machine Ai are renewably stored in the memory of the monitor unit 1.

More specifically, the memory of the monitor unit 1 is provided with K number of data tables for storing a set of monitor data for each of first to N'th injection molding machines A1 to AN. Thus, each of the data tables is loaded with N number of sets of monitor data, and the K number of data tables are loaded with (N×K) number of sets of monitor data. FIGS. 2, 3 and 4 show a first data table R1 for storing the up-to-date monitor data set, a second data table R2 for storing a past monitor data set detected in a monitor data detection period directly preceding the period for the up-to-date monitor data set, and a K'th data table RK for storing a past monitor data set detected in a monitor data detection period preceding the up-to-date monitor data set by (K−1) number of cycles, respectively. Each data table Rk (k=1, 2, ..., K) is formed of first to N'th memory regions Rik to Rik, and each of the memory regions R1k to RNk is formed of M number of sub-memory regions. Each of the sub-memory regions R1kj to RNKj (j=1, 2, ..., M) is loaded with one corresponding monitor data (injection frequency, cushioning depth, injection time, metering time, metering end position, peak value of injection pressure, or screw position for switching from injection speed control to injection pressure control). For example, the first to third sub-memory regions are loaded with the injection frequency, cushioning depth, and injection time, respectively.

Further, the monitor unit 1 selectively calculates (K−1) number of sets of monitor data variations in accordance with their corresponding ones of K number of monitor data for each injection molding machine Ai, and visually outputs the variations along with the up-to-date and past monitor data, so that the operation records of the injection molding machines A1 to AN can be properly grasped. The necessity of the delivery of the monitor data variations is assigned by manual entry by means of the keyboard of the monitor unit 1 or by description in an operation program of the monitor unit 1, and the result of the selection is stored in a flag memory built in the processor.

In manufacturing products of different types in the injection molding machines A1 to AN, it is advisable to output monitor data/monitor data variations for the injection molding machines A1 to AN in different periods, in order to properly grasp the operating states and operation records of the injection molding machines A1 to AN. To attain this, a mode (hereinafter referred to as time interval mode) in which the monitor data/variations are outputted at predetermined time intervals or a mode (hereinafter referred to as injection frequency mode) in which the monitor data/variations are outputted with every predetermined injection frequency is independently selected for each injection molding machine Ai by manual entry or program description, and the predetermined time intervals or predetermined injection frequencies are set by manual entry or program description.

Under the control of the processor of the monitor unit 1, moreover, the monitor data/variations are printed by means of the printer 2 or displayed on the display screen of the display unit 3. Further, a mode in which the monitor data/variations are printed or a mode in which the monitor data/variations are displayed on the screen is independently selected for each injection molding machine Ai by manual entry or program description. Furthermore, a mode in which the monitor data/variations are printed and displayed on the screen may be provided for selection.

The following is a description of the operation of the management system of FIG. 1.

Figure 5:
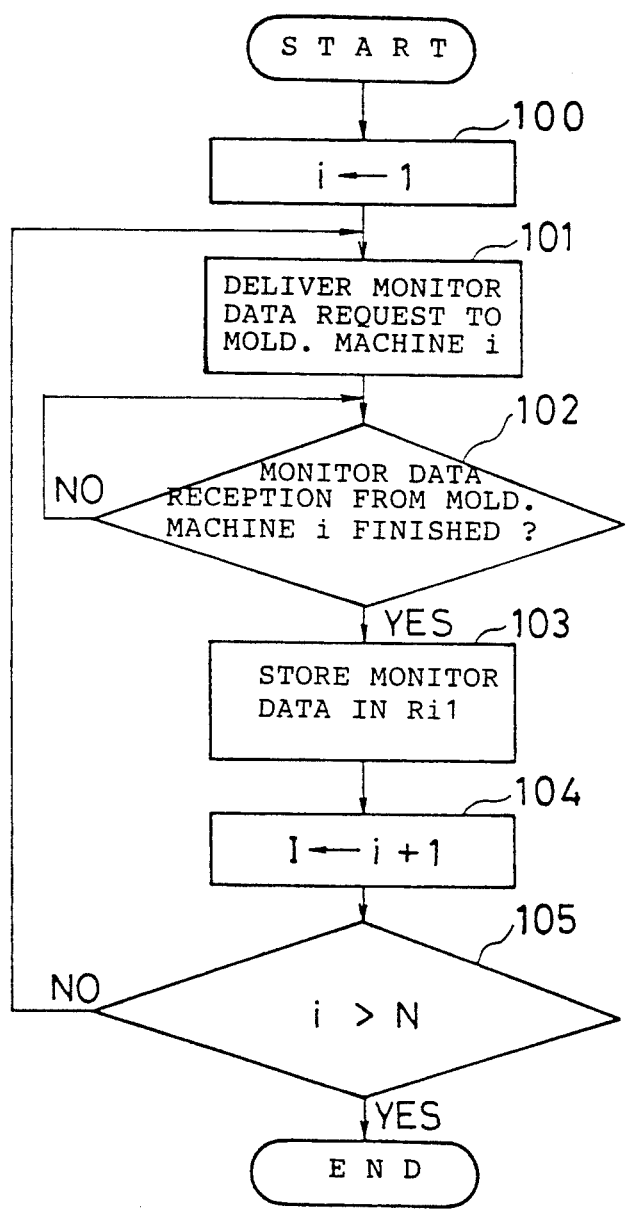
FIG. 5 is a flow chart showing a monitor data fetch process executed by means of a processor of the monitor unit.

Each of the injection molding machines A1 to AN executes the molding cycles while detecting and storing the injection frequency and the set of molding process data. After the monitor unit 1 is connected to the power supply, the processor of the monitor unit cyclically executes a monitor data fetch process shown in FIG. 5.

More specifically, in each data fetch period, the processor sets an index value i stored in its built-in register to "1" which designates the first injection molding machine A1 (Step 100), and delivers a monitor data request signal to the injection molding machine A1 (Step 101). In response to this, the injection molding machine A1 delivers the set of molding process data, detected and stored immediately before the reception of the monitor request signal, to the monitor unit 1. The processor of the monitor unit 1 receives the set of molding process data delivered from the injection molding machine A1 as a set of up-to-date monitor data. When the processor then concludes in Step 102 that the reception of the monitor data set is finished, the corresponding monitor data (injection frequency, cushioning depth, injection time, etc.) are stored in each of first to M'th sub-memory regions R111 to R11M of the first memory region R11 of the first data table R1 (FIG. 2) in the memory of the monitor unit 1 (Step 103). Then, the processor increments the index value i by "1" to update it (Step 104), and determines whether or not the total number N of injection molding machines is exceeded by the updated index value i (Step 105). In this case, the value V is not exceeded by the updated index value i (=2), so that Steps 101 to 105 are repeatedly executed, whereby the second memory region R21 of the first data table R1 is loaded with a set of up-to-date monitor data for the second injection molding machine A2. Likewise, the first data table R1 is loaded successively with a set of up-to-date monitor data for each of the third to N'th injection molding machines A3 to AN. Then, it is concluded, in Step 105 of the monitor data fetch process for the N'th injection molding machine AN, that the value N is exceeded by the updated index value i (=N+1), whereupon the monitor data fetch process for this period is finished.

Figure 6:
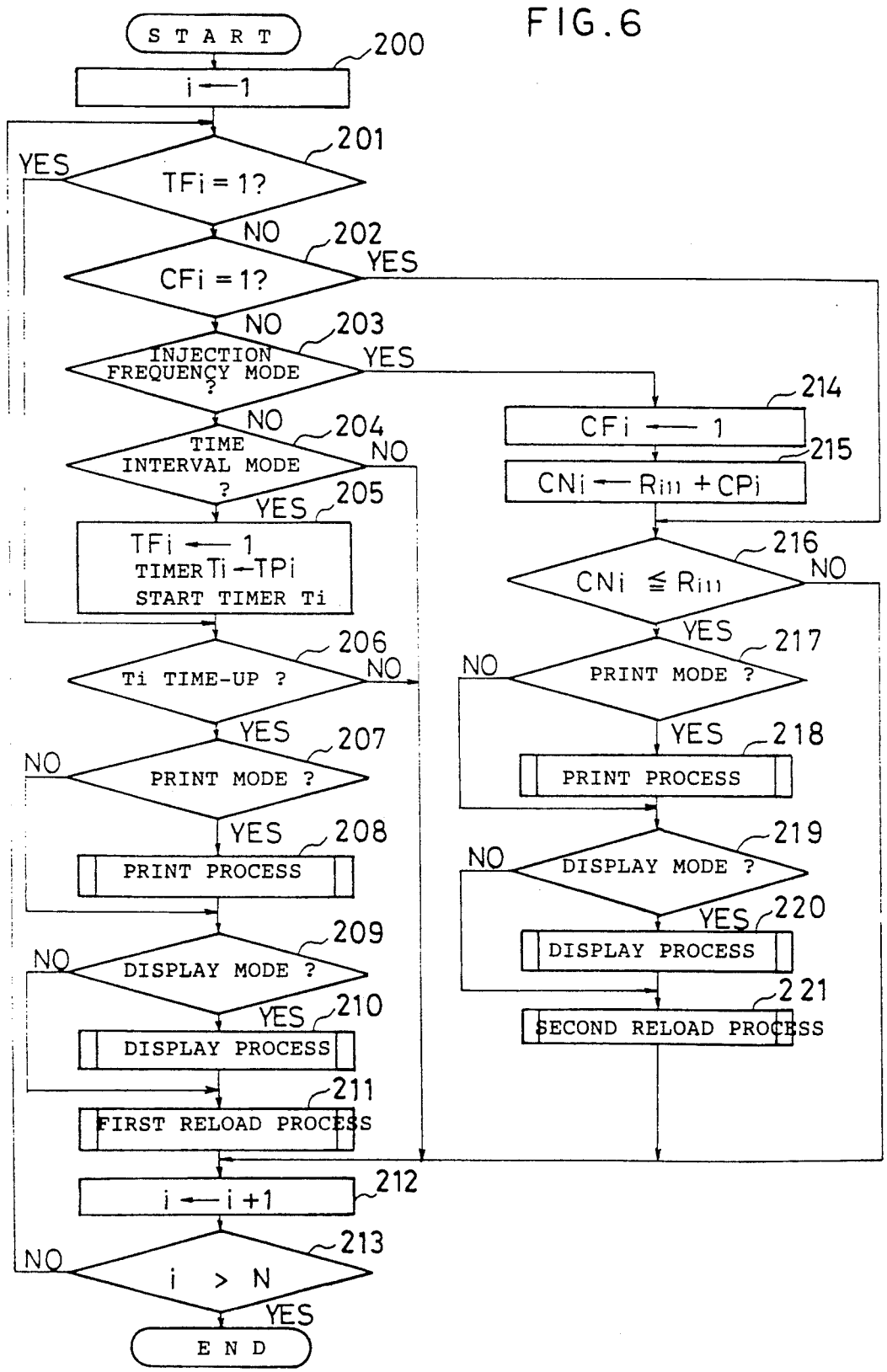
FIG. 6 is a flow chart showing a monitor data print-/display process executed by means of the processor of the monitor unit.

While cyclically executing the monitor data described above, the processor of the monitor unit 1 repeatedly executes a monitor data print/display process shown in FIG. 6 in a period shorter than the data fetch process execution period.

More specifically, in each data print/display period, the processor sets the index i to the value "1" which designates the first injection molding machine A1 (Step 200), and determines whether to not a flag TFi (=TF1) is set to the value "1" which indicates that time measurement (mentioned later) for determining the output timing for the monitor data for the injection molding machine Ai (=A1) is being made (Step 201). In this case, the flag TFi is left reset to the value "0" by initial setting at the time of the connection to the power supply, and the result of decision in Step 201 is negative, so that the processor further determines whether or not a flag CFi (=CF1) is set to the value "1" which indicates that injection frequency measurement (mentioned later) for determining the output timing for the monitor data for the injection molding machine A1 is being made (Step 202). In this case, the flag CFi is left reset to the initially set value "0," so that the result of decision in Step 202 is negative. Thereupon, the processor determines whether or not the injection frequency mode is selected for the injection molding machine A1, with reference to the value stored in the corresponding flag memory (Step 203). If the result of this decision is negative, the processor further determines whether or not the time interval mode is selected (Step 204).

If neither of the injection frequency mode and the time interval mode is selected, and therefore, it is concluded in Steps 203 and 204 that the monitor data for the first injection molding machine A1 need not be outputted, the processor increments the index value i by "1" to update it in Step 212, and then determines whether or not the total number N of injection molding machines is exceeded by the updated index value i (Step 213). If the result of this decision is negative, the program returns to Step 201. If it is concluded in Step 204 that the time interval mode is selected, on the other hand, the processor sets a timer time TPi (=TP1), which is previously set in a timer Ti (=T1) associated with the monitor data output for the injection molding machine Ai (=A1) and is indicative of the monitor data output timing, and then starts the timer, and sets the flag TF1 for the injection molding machine A1 to the value "1" which indicates that the time measurement is being made (Step 205). If it is concluded in the next step or Step 206 that the preset time of the timer T1 is not up yet, the program returns to Step 201 via Steps 212 and 213. If it is concluded in Step 203 that the injection frequency mode is selected, on the other hand, the processor sets the flag CF1 for the injection molding machine A1 to the value "1" which indicates that the injection frequency measurement is being made (Step 214), adds a predetermined injection frequency CP1 (generally, injection frequency CPi for an i'th injection molding machine), previously set for the injection molding machine A1, to the current injection frequency R111 for the injection molding machine A1 read from the first sub-memory region R111 (generally, Ri11 associated with the i'th injection molding machine) of the first memory region R11 of the first data table R1, and loads the resulting sum (=R111+CP1), which is indicative of the monitor data output timing, into a register CN1 (Step 215). Then, the processor determines whether or not the current injection frequency R111 is not lower than the register value CN1 (Step 216). If the result of this decision is negative, the program returns to Step 201 via Steps 212 and 213. If the injection frequency stored in the injection molding machine at the time of the connection of the injection molding machine to the power supply is reset to "0," the register CNi is reset to "0" when the monitor unit 1 is connected to the power supply.

When the program returns to Step 201 after the preliminary arrangement for the delivery of the monitor data for the first injection molding machine A1 is finished in this manner, the processor makes preparations for the delivery of the monitor data for the second injection molding machine A2. Likewise, preparations for the third to N'th injection molding machines A3 to AN are made in succession. Then, if it is concluded, in Step 213 immediately after the completion of the preparations for the injection molding machine AN, that the value N is exceeded by the updated index value i, the monitor data print/display process for a first processing period is finished.

In the monitor data print/display process for the next processing period, the processor determines whether or not the time measurement or injection frequency measurement is being made with respect to the first injection molding machine A1, which is assigned by setting the index i to the value "1" in Step 200 (Steps 201 and 202). If both the results of decision in these two steps are negative, the results of decision in Steps 203 and 204 are also negative, as is evident from the above description, so that the program proceeds to Step 201 via Steps 212 and 213, whereupon the same discrimination process is started for the second injection molding machine A2. When the time measurement is being made so that the preset time of the timer T1 is not up, or when the injection frequency measurement is being made so that the register value CN1 is not reached by the current injection frequency R111, it is concluded that the monitor data output timing is not attained, whereupon the program proceeds to Step 201. Thereafter, whether or not the monitor data output timings for the injection molding machines A2 to AN are attained is determined in succession while updating the index value i. If no attainment of the monitor data output timings is discriminated, the monitor data print/display process for the present processing cycle is finished without effecting monitor data print/display.

Thereafter, the same monitor data print/display process is cyclically executed. If it is concluded that the preset time of the timer Ti associated with any one injection molding machine Ai is up, or that the register value CNi is reached by the current injection frequency Ri11 for the injection molding machine Ai (Step 206 or 216), the processor concludes that the output timing for the monitor data for the i'th injection molding machine Ai is attained, and executes the monitor data print process or monitor data display process.

More specifically, if it is concluded that the preset time of the timer Ti is up, the processor determines whether or not a print mode is selected as a monitor data output mode for the i'th injection molding machine Ai, with reference to the corresponding flag memory (Step 207). If the result of this decision is positive, the print process is started (Step 28). In the print process illustrated as a subroutine in FIG. 7, the processor sets an index k to the value "K" to assign the K'th data table RK which is loaded with the oldest or K'th monitor data set (Step SB301), and reads out the K'th monitor data set stored in an i'th memory region Rik of the K'th data table RK, and delivers it to the printer 2 (Step SB302). As a result, the K'th monitor data set, detected in a detection period preceding the detection period for the up-to-date monitor data set for the injection molding machine Ai by (K−1) number of cycles, is printed by means of the printer 2, as illustrated in Table 1 below. Then, the (K−1)'th monitor data set in the i'th memory region Ri(k−1) of the (K−1)'th table RK is delivered to the printer 2 to be printed thereby (Step SB303). The processor further determines the necessity of the delivery of the monitor data variations for the injection molding machine Ai with reference to the corresponding flag memory (Step SB304). If the result of this decision is positive, the processor calculates the variations of the data of the (K−1)'th monitor data set with respect to their corresponding data of the K'th monitor data set, and delivers them to the printer 2 (Steps SB305 and SB306). Thereupon, as illustrated in Table 1, a set of monitor data variations are printed on those parts of printing paper which are situated below print regions for the K'th monitor data set and the (K−1)'th monitor data set. After the monitor data variations are printed, or after it is concluded in Step SB304 that the delivery of the monitor data variations is unnecessary, the processor decrements the index k by "1" to update it (Step SB307), and determines whether or not the updated index k is greater than "1." If the result of this decision is positive, the program returns to Step SB302.

Figure 7:
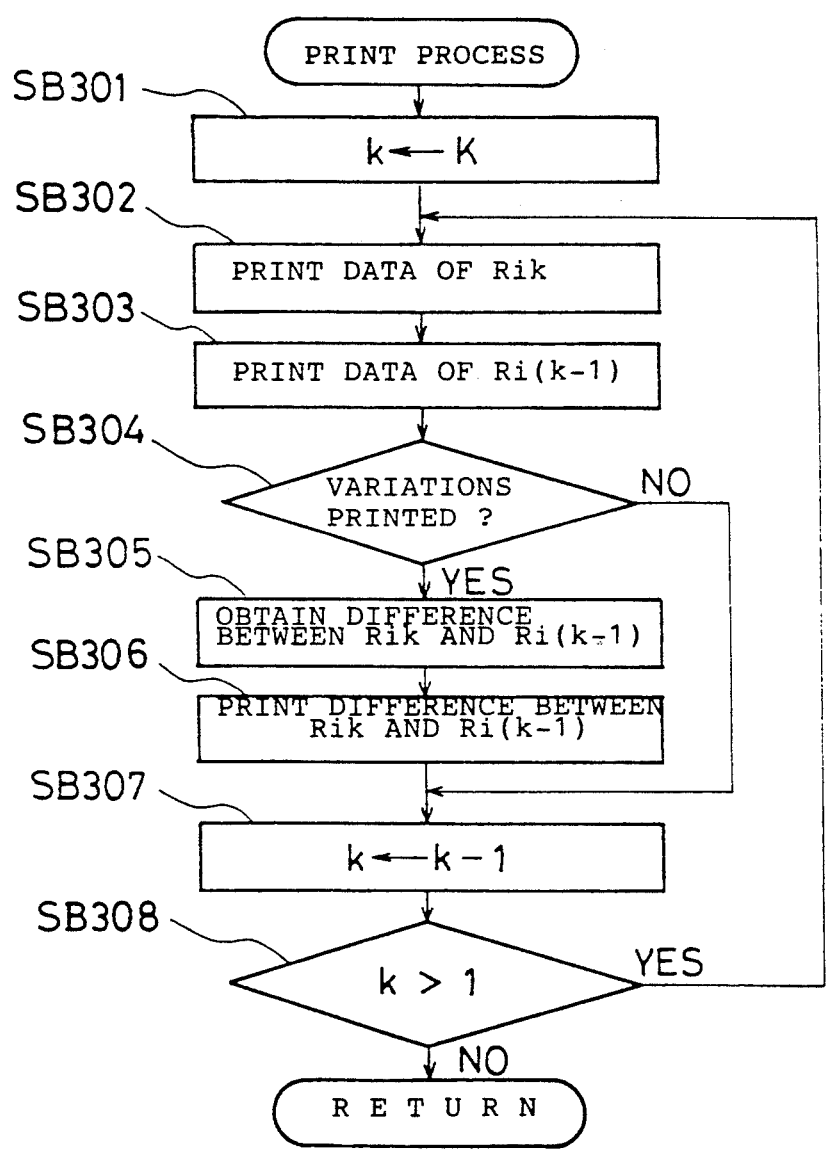
FIG. 7 is a flow chart showing a monitor data print process.

Thereafter, Steps SB302 to SB308 are repeatedly executed while updating the index k, and (K−1) number of data groups, each formed of two sets of monitor data (or two sets of monitor data and monitor data variations associated therewith) are printed in succession. When the index k is decremented to "1" after two sets of up-to-date monitor data (or two sets of up-to-date monitor data and monitor data variations associated therewith) for the injection molding machine Ai are printed, the result of decision in the immediately following step or Step SB308 is negative, and the termination of the print process of FIG. 7 is discriminated. In this case, the program returns to the main routine (monitor data print/display process) of FIG. 6.

Figure 8:
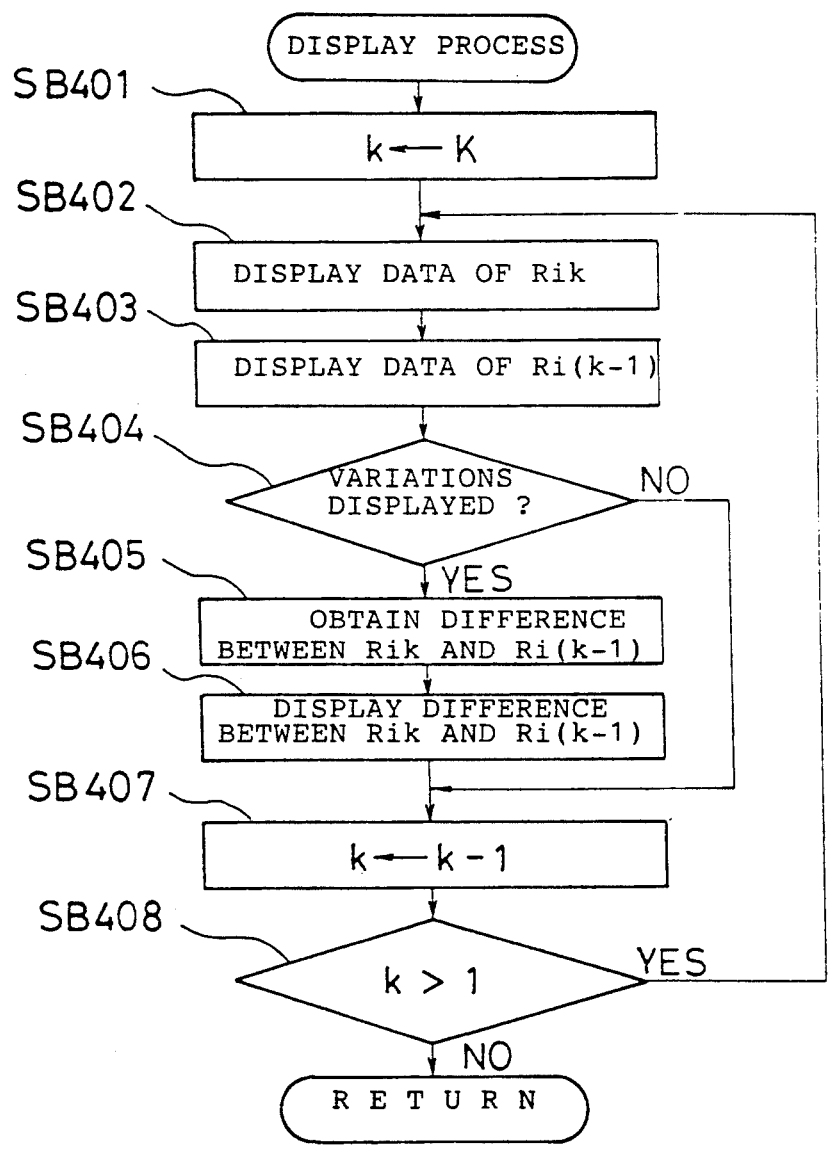
FIG. 8 is a flow chart showing a monitor data display process.

If it is concluded in Step 207 after the time-up of the timer Ti that the print mode is not selected as the monitor data output mode for the injection molding machine Ai, on the other hand, the processor further determines whether or not a display mode is selected (Step 209). If the result of this decision is positive, the program proceeds to the display process illustrated as a subroutine in FIG. 8 (Step 210). As seen from FIG. 8, the display process is executed in the same manner as the print process of FIG. 7. Therefore, a description of the display process is omitted herein. When the termination of the display process is discriminated (SB408), the program returns to the main routine of FIG. 6.

Figure 9:
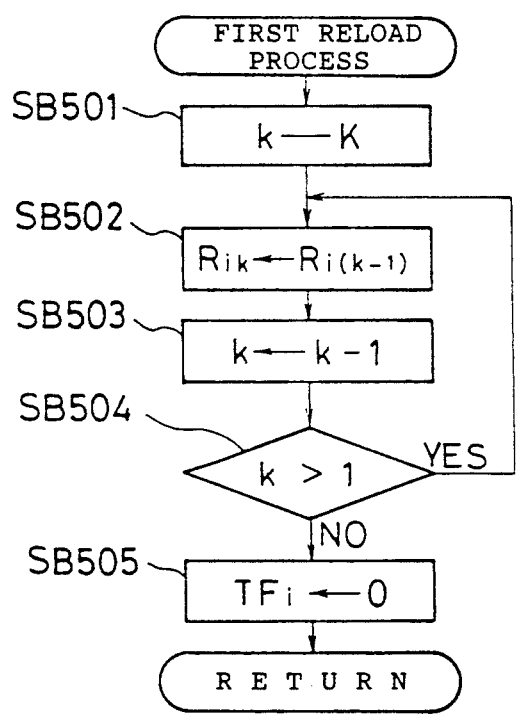
FIG. 9 is a flow chart showing a monitor data reload process executed following the monitor data print or display process when the print or display process is executed with every predetermined time interval.

When the delivery (print or display) of the monitor data for the injection molding machine Ai is finished in this manner, a first reload process, illustrated as a subroutine in FIG. 9, is started to prepare for the next monitor data delivery for the injection molding machine Ai (Step 211). In the first reload process, the processor sets the data table total number K to the index k (Step SB501), and transfers to and loads the (K−1)'th monitor data set in the i'th memory region Ri(K−1) of the (K−1)'th table R(K−1), as a new K'th monitor data set, into the i'th memory region RiK of the K'th data table RK (Step SB502). Then, the processor decrements the index k by "1" to update it, and determines whether or not the updated index k is greater than "1" (Step SB504). If the result of this decision is positive, the program returns to Step SB502. Thereafter, Steps SB502 to SB504 are repeatedly executed while decrementing the index k, and the (K−2)'th to first monitor data sets for the injection molding machine Ai are loaded as new (K−1)'th to second monitor data sets into the respective i'th memory regions of the data tables R(K−1) to R2, respectively.

If it is concluded, in Step SB504 immediately after a set of up-to-date printed or displayed monitor data is loaded as a past monitor data set into the second data table R2, that the updated index k (=1) is greater than "1," the flag TFi is reset to "0" which indicates that the time measurement is not being made (Step SB505), whereupon the first reload process of FIG. 9 is finished, and the program proceeds to Step 211 of the main routine of FIG. 6.

Figure 10:
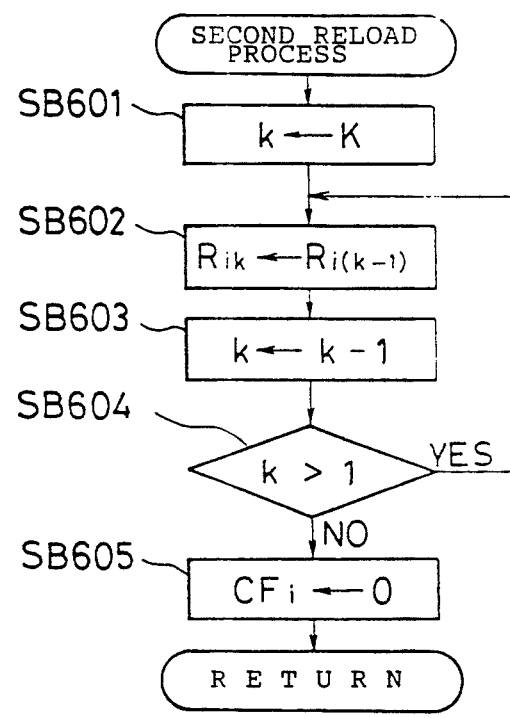
FIG. 10 is a flow chart showing a monitor data reload process executed when the monitor data print or display process is executed with every predetermined injection frequency.

If it is concluded in Step 216 that the register value CNi is reached by the current injection frequency Ri11 of any one injection molding machine Ai, while the monitor data print/display process is being cyclically executed, the processor concludes that the output timing for the monitor data for the i'th injection molding machine Ai is attained. In this case, if the processor concludes in Step 217 that the print mode is selected as the monitor data output mode for the injection molding machine Ai, it executes the print process described before with reference to FIG. 7 (Step 218). If the processor concludes in Step 219 that the display mode is selected, it executes the display process mentioned before with reference to FIG. 8 (Step 220). When the print or display process is finished, the processor executes a second reload process (FIG. 10), which includes Steps SB601 to SB604, identical with Steps SB501 to SB504 of the first reload process mentioned before with reference to FIG. 9, and Step SB605 similar to Step SB505, in which the flag CFi is reset to "0" (Step 221). After the second reload process is finished, the program proceeds to Step 212.

TABLE 1

| Injection Frequency | Cushioning Depth | Injection Time | ... |
|---|---|---|---|
| 5,000 | 0.54 | 1.25 | ... |
| 6,000 | 0.54 | 1.25 | ... |
| Variation | 0.00 | 0.00 | ... |
| 6,000 | 0.54 | 1.25 | ... |
| 7,000 | 0.56 | 1.22 | ... |
| Variation | 0.02 | −0.03 | ... |
| 7,000 | 0.56 | 1.22 | ... |
| 8,000 | 0.58 | 1.20 | ... |
| Variation | 0.02 | −0.02 | ... |
| . | . | . | . |
| . | . | . | . |
| . | . | . | . |

Every time the output timing for the monitor data associated with any one of the injection molding machines A1 to AN is attained in the aforesaid manner, a set of up-to-date monitor data and (K−1) number of sets of past monitor data for the injection molding machine Ai concerned are visually outputted (printed or displayed on the screen). If necessary, moreover, (K−1) number of sets of monitor data variations for the injection molding machine Ai are simultaneously outputted. Then, the outputted monitor data sets are reloaded.

Table 1 shows some of print data for the injection molding machine A1 obtained when the monitor data and monitor data variations are printed with every injection frequency of 1,000 cycles.

The present invention is not limited to the embodiment described above, and various modifications may be effected therein.

According to the embodiment, for example, the monitor data variations are calculated by means of the processor every time these variations are outputted. Alternatively, however, a required number of monitor data variation storage tables, e.g., K number of tables, may be provided so that two corresponding tables can be referred to when the monitor data variations are outputted. In this case, the monitor data variations are calculated, in accordance with the up-to-date monitor data and the past monitor data detected in the directly preceding detection period, and loaded into a first table by means of the processor, and the stored monitor data variations are transferred between each adjacent tables, following the steps of procedure described with reference to FIG. 9, every time new monitor data are detected.

According to the embodiment, moreover, the monitor data/monitor data variations never fail to be printed or displayed on the screen every time the monitor data output timing associated with each injection molding machine is attained. Alternatively, however, the system may be designed so that the monitor data/monitor data variations can be displayed only when a code for assigning a specific injection molding machine is manually inputted through the keyboard of the monitor unit 1 by an operator, in the case where the display mode is selected.

We claim:

1. An operating state monitoring method for a plurality of injection molding machines, comprising the steps of:
   (a) periodically detecting a set of monitor data indicative of various operating states of a group of the plurality of injection molding machines;
   (b) storing at least one set of past detected monitor data from the set of periodically detected monitor data for each injection molding machine in the group of injection molding machines; and
   (c) simultaneously visually outputting a set of up-to-date detected monitor data from the periodically detected set of monitor data and the at least one set of past detected monitor data for the group of injection molding machines associated therewith.

2. A monitoring method according to claim 1, wherein said up-to-date and past monitor data sets associated with each of said injection molding machines in said group are outputted at predetermined time intervals.

3. A monitoring method according to claim 2, wherein said predetermined time intervals are independently set for each said injection molding machine.

4. A monitoring method according to claim 1, wherein said up-to-date and past monitor data sets associated with each of said injection molding machines in said group are outputted with every predetermined molding cycle frequency.

5. A monitoring method according to claim 4, wherein said predetermined molding cycle frequency is independently set for each said injection molding machine.

6. A monitoring method according to claim 1, further comprising the step of independently selecting, for each said injection molding machine, a mode in which said up-to-date and past monitor data sets are outputted at predetermined time intervals or a mode in which said up-to-date and past monitor data sets are outputted with every predetermined molding cycle frequency.

7. A monitoring method according to claim 6, wherein said predetermined time intervals and said predetermined molding cycle frequency are independently set for each said injection molding machine.

8. A monitoring method according to claim 1, further comprising the step of independently selecting, for each injection molding machine, a mode in which at least a set of monitor data variations are calculated on the basis of the set of up-to-date monitor data and at least a set of past monitor data, and said at least a set of monitor data variations, along with the up-to-date and past monitor data sets, is visually outputted, or a mode in which said at least a set of monitor data variations is neither calculated nor outputted.

9. A monitoring method according to claim 1, wherein said up-to-date and past monitor data sets are outputted by printing said monitor data sets.

10. A monitoring method according to claim 1, wherein said up-to-date and past monitor data sets are outputted by displaying said monitor data sets on a screen.

11. A monitoring method according to claim 1, wherein a mode in which said up-to-date and past monitor data sets are outputted by printing said monitor data sets, a mode in which said up-to-date and past monitor data sets are outputted by displaying said monitor data sets on a screen, or a mode in which said up-to-date and past monitor data sets are outputted by printing and displaying said monitor data sets on the screen is independently selected for each said injection molding machine.

* * * * *